US007340785B2

(12) United States Patent
Weedling et al.

(10) Patent No.: US 7,340,785 B2
(45) Date of Patent: Mar. 11, 2008

(54) SANITARY LINER FOR A PATIENT TRANSFER MATTRESS

(76) Inventors: Robert E. Weedling, 4773 Pinehurst Cir., Center Valley, PA (US) 18034; James E. Weedling, 5456 Northwood Dr., Center Valley, PA (US) 18034

( * ) Notice: Subject to any disclaimer, the term of this patent is extended or adjusted under 35 U.S.C. 154(b) by 303 days.

(21) Appl. No.: 11/168,627

(22) Filed: Jun. 28, 2005

(65) Prior Publication Data

US 2006/0000016 A1 Jan. 5, 2006

Related U.S. Application Data

(60) Provisional application No. 60/585,304, filed on Jul. 2, 2004.

(51) Int. Cl.
*A61G 7/14* (2006.01)
*A47C 27/08* (2006.01)
*B65G 7/06* (2006.01)

(52) U.S. Cl. ...................... 5/81.1 R; 5/81.1 HS; 5/706

(58) Field of Classification Search .................. 5/714, 5/715, 706–713, 644, 654, 655.3, 81.1 R, 5/81.1 HS, 496, 691, 413 AM
See application file for complete search history.

(56) References Cited

U.S. PATENT DOCUMENTS 4,549,323 A * 10/1985 Brockhaus ..................... 5/668
4,627,426 A * 12/1986 Wegener et al. ............ 604/356
4,686,719 A 8/1987 Johnson et al. ............... 5/81 R
4,977,633 A * 12/1990 Chaffee ......................... 5/706
5,005,236 A * 4/1991 Hutchinson ............. 5/413 AM
5,067,189 A 11/1991 Weedling et al. ............. 5/81 R
5,249,319 A * 10/1993 Higgs ........................... 5/714
5,289,602 A * 3/1994 Trader .......................... 5/669
5,528,779 A * 6/1996 Lee et al. ................ 5/413 AM
RE35,299 E 7/1996 Weedling et al. .......... 5/81.1 T
5,561,873 A 10/1996 Weedling ....................... 5/711
6,016,582 A * 1/2000 Larson .......................... 5/691
6,073,291 A 6/2000 Davis ............................ 5/711
6,233,764 B1 * 5/2001 Orr ............................... 5/496
6,954,957 B2 * 10/2005 Metzger et al. ................ 5/706
6,966,090 B2 * 11/2005 McClintock et al. .......... 5/706
7,007,329 B2 * 3/2006 Metzger ........................ 5/706
7,124,457 B2 * 10/2006 Metzger ........................ 5/706
7,155,766 B1 * 1/2007 Gilchrest et al. .............. 5/732
7,243,382 B2 * 7/2007 Weedling et al. .......... 5/81.1 R
2002/0133879 A1 * 9/2002 Smith et al. ................ 5/413 R
2002/0166168 A1 11/2002 Weedling et al. .......... 5/81.1 R
2005/0028273 A1 * 2/2005 Weedling et al. .......... 5/81.1 R
2005/0034229 A1 * 2/2005 Weedling et al. .......... 5/81.1 R
2005/0034230 A1 * 2/2005 Weedling et al. .......... 5/81.1 R
2006/0000016 A1 * 1/2006 Weedling et al. ........ 5/81.1 HS
2006/0037136 A1 * 2/2006 Weedling et al. ........ 5/81.1 HS
2006/0253976 A1 * 11/2006 Weedling et al. .......... 5/81.1 R
2007/0234480 A1 * 10/2007 Crousore et al. .............. 5/706

* cited by examiner

*Primary Examiner*—Robert G. Santos
(74) *Attorney, Agent, or Firm*—Drinker Biddle & Reath LLP

(57) ABSTRACT

A patient transfer device includes an inflatable mattress and a liner releasably attached to the inflatable mattress. The inflatable mattress includes a top sheet having opposite side edges and a bottom sheet defining a plurality of holes to create a cushion of escaping air beneath the mattress. The cushion of air facilitates sliding of the mattress with respect to an underlying support surface. The liner includes an intermediate portion adapted to cover the top sheet of the mattress and opposite side portions extending beyond the side edges of the top sheet.

9 Claims, 2 Drawing Sheets

SANITARY LINER FOR A PATIENT TRANSFER MATTRESS

CROSS-REFERENCE TO RELATED APPLICATION

This application claims priority of U.S. provisional patent application No. 60/585,304, filed Jul. 2, 2004.

FIELD OF THE INVENTION

The present invention relates generally to patient transfer mattresses. More particularly, the invention relates to a patient transfer mattress having a releasably attached liner.

BACKGROUND OF THE INVENTION

Patient transfer mattresses include an inflatable plenum and discharge air through a plurality of holes in a bottom sheet to create a cushion of air beneath the mattress. The cushion of air facilitates movement of the mattress with respect to a support surface. An example of a known transfer mattress is disclosed in U.S. Pat. No. 5,561,873 (Weedling).

U.S. patent Pub. No. 2002/0166168A, discloses a patient transfer mattress in which various accessories can be removably attached over the top surface of the mattress by fasteners mounted on tabs located at the top of the mattress adjacent its periphery.

SUMMARY OF THE INVENTION

According to an exemplary embodiment of the invention, a patient transfer device also comprises a liner releasably attached to the inflatable mattress. The liner includes an intermediate portion adapted to cover the top sheet of the mattress and opposite side portions extending beyond the side edges of the top sheet.

According to another exemplary embodiment of the invention, the liner has a central portion adapted to cover the top sheet of the mattress and opposite side portions, and each of the side portions of the liner is adapted for releasable attachment to the mattress adjacent the bottom sheet.

According to another embodiment of the invention, the liner includes a central portion adapted to cover the top sheet of the mattress and opposite side portions. The patient transfer device also includes a plurality of elongated straps secured to the mattress. Each of the elongated straps is adapted for releasable attachment to the liner adjacent a terminal end of the strap. Each of the side portions of the liner is attached to at least one of the straps.

BRIEF DESCRIPTION OF THE DRAWINGS

For the purpose of illustrating the invention, the drawings show forms that are presently preferred; it being understood, however, that this invention is not limited to the precise arrangements and instrumentalities shown in the drawings.

DESCRIPTION OF THE INVENTION

Figure 2:
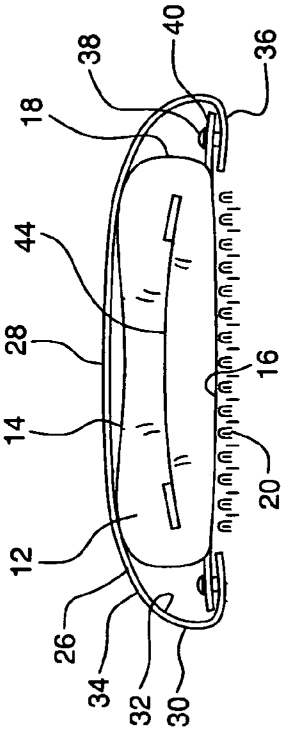
FIG. 2 is an end view of the mattress and liner of FIG. 1.
Figure 1:
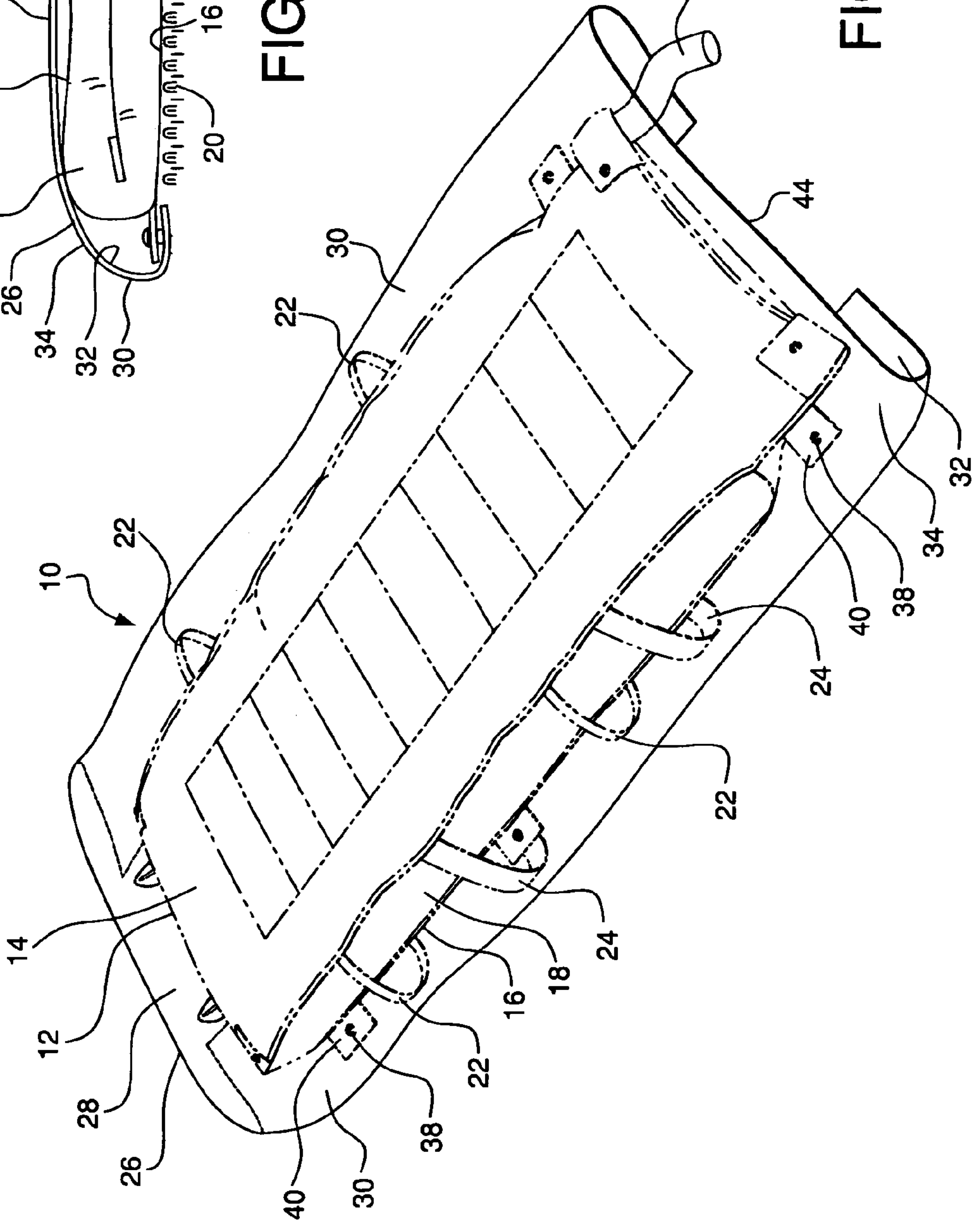
FIG. 1 is a perspective view of a patient transfer mattress and sanitary liner according to one embodiment of the invention, the liner shown as transparent to facilitate illustration.

Referring to the drawings, where like numerals identify like elements, there is shown in FIGS. 1 and 2 a patient transfer device 10 according to the present invention. The transfer device 10 includes an inflatable mattress 12 having a top sheet 14, a bottom sheet 16 and side panels 18. The bottom sheet 16 includes a plurality of openings for discharging air from the mattress 12 to create a cushion 20 of escaping air beneath the mattress 12. The transfer device 10 also includes looped handles 22 and patient restraint straps 24 on opposite sides of the mattress 12. The restraint straps 24 are wrapped in FIG. 1 such that a portion of the restraint straps are located underneath the mattress 12. A suitable construction for the inflatable mattress 12 is described in U.S. Pat. No. 5,561,873.

The patient transfer device 10 also includes a protective liner 26 releasably attached to the inflatable mattress 12. The liner 26 is shown in FIG. 1 as a transparent sheet to better illustrate of the transfer device 10. It should be understood, however, that the liner ned not be transparent. An opaque material may be preferred. U.S. Publication No. 2002/0166168A discloses how to releasably attach an accessory to an inflatable transfer mattress, and the protective liner 26 may be attached to the mattress 12 in that manner. U.S. Publication No. 2002/0166168A is incorporated herein by reference in its entirety.

The liner 26 provides a sanitary cover to limit contamination of the inflatable mattress 12. Contaminants that might be discharged from the patient, for example, will contact the liner 26 instead of the underlying inflatable mattress 12, thereby eliminating the need to clean the inflatable mattress 12 following the procedure. The liner 26 may be made from a material that is capable of being sterilized for reuse following completion of a medical procedure. It is within the scope of the invention, however, that the liner 26 could be a single-use liner adapted for disposal after completion of a procedure.

The liner 26 includes a central portion 28 that is preferably dimensioned to cover all of the top sheet 14 of the inflatable mattress 12. The liner 26 also includes side portions 30 on opposite sides of the central portion 28. As shown in FIG. 1, the side portions 30 are dimensioned to extend downwardly over the side panels 18 of the mattress 12 such that liner 26 covers the top sheet 14 and the side panels. The liner 26, therefore, covers the portions of the inflatable mattress 12 most likely to contact a patient being supported on the mattress 12. As shown in FIG. 2, a majority of the bottom sheet 16, including the perforated portion of the bottom sheet forming the air cushion 20, remains uncovered by the liner. Arranged in this manner, the liner 26 optimizes coverage of the inflatable mattress 12 by covering those portions of the mattress most likely to come in contact with a patient while leaving the perforated bottom surface uncovered to permit air discharge from the mattress for creating an air cushion 20 beneath the supported patient.

Referring to FIG. 2, the liner 26 includes surfaces 32, 34 respectively defining inner and outer surfaces of the liner 26 when the liner 26 is attached to the inflatable mattress 12. The liner 26 includes fasteners 36 secured to each of the side portions 30 of the liner 26 on the inner surface 32 of the liner 26. The inflatable mattress 12 includes fasteners 38, which cooperatively engage the fasteners 36 of the liner 26 to releasably secure the liner 26 to the mattress 12. The fasteners 38 of the mattress 12 are mounted on tabs 40 preferably secured to the bottom sheet 16 of mattress 12 adjacent the periphery of the bottom sheet 16. As shown in FIG. 2, the fasteners 38 of the mattress 12 are mounted on a bottom surface of the mounting tabs 40.

Referring to FIG. 2, the side portions 30 of the liner 26 are wrapped around the fastener tabs 40 of the mattress 12 such that the liner 26 forms an envelope enclosing the top sheet 14 and side panels 18 of the mattress 12 as well as the fastener mounting tabs 40. It should be understood that this arrangement is not required by the invention. It is within the scope of the invention that the fasteners 36 of the liner 26 could be secured to either of surfaces 32, 34 of the liner 26 and that the fasteners 38 of the mattress 12 could be secured to either the top or bottom of the tabs 40. It is also not a requirement that the fasteners 38 of the mattress 12 be mounted on extending tabs 40 secured to the mattress 12. The fasteners 38 could, alternatively be mounted directly on the mattress 12.

Preferably, the fasteners 36, 38 of the liner 26 and inflatable mattress 12 comprise snaps that are engageable with each other. Any suitable means of releasable attachment, however, could be used instead of snaps, including for example, hook and loop type fasteners.

Referring to FIG. 1, an air inlet hose 42 is shown extending from an end 44 of the inflatable mattress 12 to illustrate that the mattress preferably includes an inlet port located adjacent one end 44 of mattress 12. The inlet port of the mattress 12 is preferably adapted to provide for longitudinal connection of the inlet hose 42. This arrangement facilitates connection between the inflatable mattress 12 and a source of air, such as an air pump, while the inflatable mattress 12 is covered by the attached liner 26 as shown.

Figure 4:
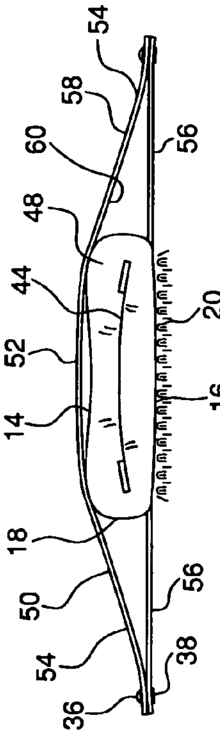
FIG. 4 is an end view of the mattress and liner of FIG. 3.
Figure 3:
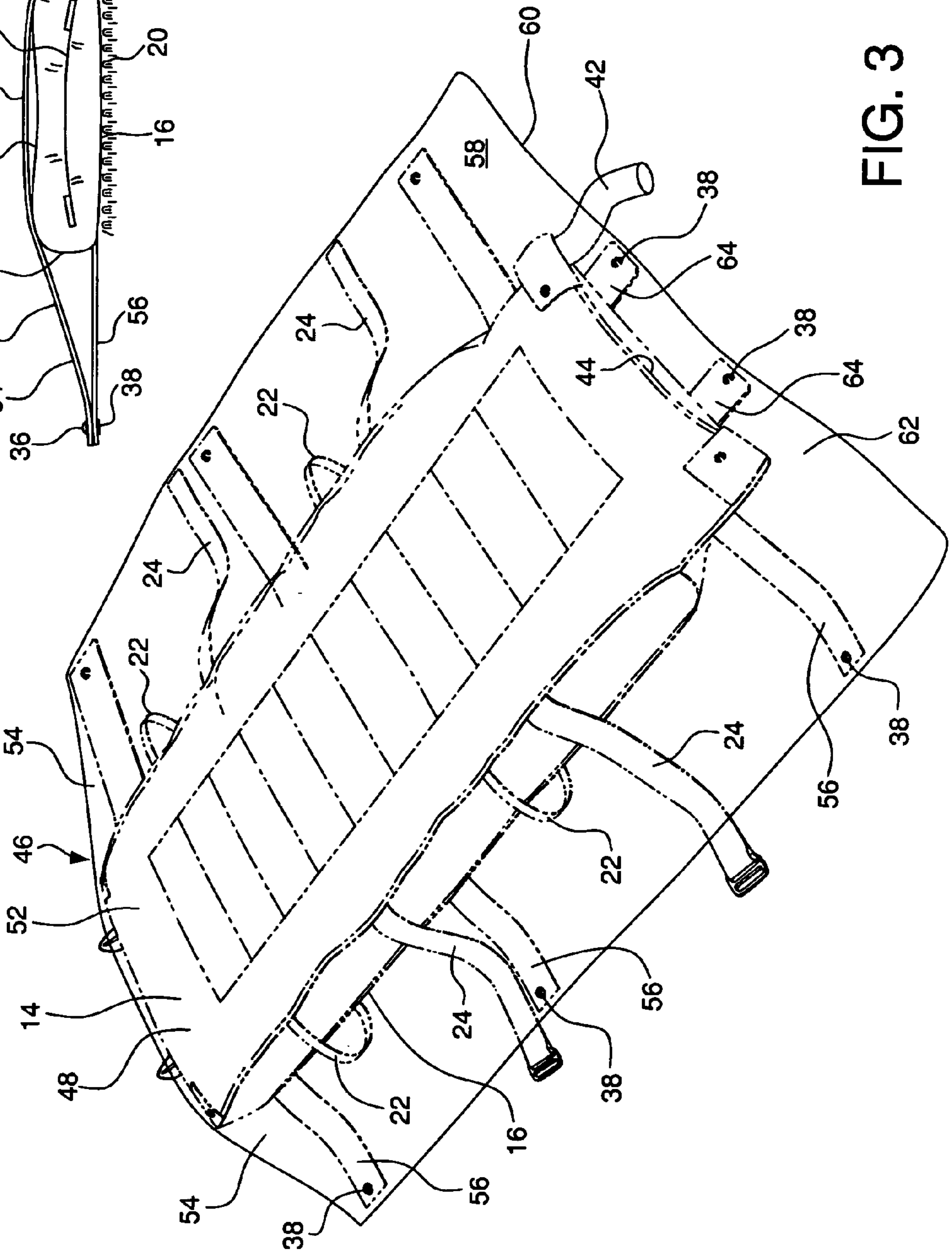
FIG. 3 is a perspective view of a patient transfer mattress and sanitary liner according to a second embodiment of the invention, the liner shown as transparent to facilitate illustration.

A second embodiment of a patient transfer device 46 according to the invention is shown in FIGS. 3 and 4. The transfer device 46 includes an air mattress 48 that includes top and bottom sheets 14, 16 and side panels 18, similar to the air transfer mattress 12 of FIGS. 1 and 2. Preferably, the air transfer mattress 48 of FIGS. 3 and 4 also includes handles 22 and patient restraint straps 24 similar to mattress 12.

The patient transfer device 46 includes a sanitary liner 50. In a similar manner as the patient transfer device 10 of FIGS. 1 and 2, the liner 50 is shown as transparent to facilitate illustration of the invention. The liner 50 includes a central portion 52 that is dimensioned to cover the top sheet 14 of the air transfer mattress 48. The liner 50 includes side portions 54 on opposite sides of the central portion 52. The side portions 54 of liner 50 are elongated such that the side portions 54 extend outwardly from the air transfer mattress 48 for attachment to elongated straps 56. Preferably, the straps 56 are secured to the mattress 48 adjacent the periphery of the bottom sheet 16. The elongated straps 56, however, could alternatively be secured to the mattress 12 at any suitable location, such as to the side panels 18, to extend outwardly for attachment to the liner 50. As may be seen by comparing FIGS. 2 and 4, the liner 50 defines a relatively wide footprint of coverage compared to that defined by liner 26 of transfer device 10.

The liner 50 includes surfaces 58, 60 respectively forming top and bottom surfaces of the liner 50 when the liner 50 is attached to the inflatable mattress 48. As shown in FIG. 4, the liner 50 includes fasteners 36 mounted to the side portions 54 of the liner 50 on the bottom surface 60 for attachment to cooperative fasteners 38 mounted on a top surface of the elongated straps 56. Similar to transfer device 10, the fasteners 36, 38 of transfer device 46 are preferably snaps but could, alternatively embody any suitable means for releasably attaching the liner 50 to the mattress 48.

The widened coverage provided by liner 50 provides an increased upper surface for the liner 50 to spread the protective coverage area for limiting contact between contaminants and the underlying mattress 48. The construction of transfer device 46 also facilitates sliding transfer of a supported patient from a distance from the sides of the mattress 48 by grasping the elongated straps 56. Such sliding transfer from a distance is desirable when transfer is required from a first support surface, such as an examination table, to a second surface, such as a gurney, located between the first support surface and the care giver. The elongated straps 56 allow the care giver to apply a pulling force to the mattress 48 without having to bend over the intermediate support surface to grasp the mattress 48.

Referring to FIG. 3, the liner 50 preferably also includes an end portion 62 dimensioned to extend beyond an end 44 of the inflatable mattress 48 when the liner 50 is attached to the mattress 48. The mattress 48 includes fasteners 38 mounted on tabs 64 secured to the mattress 48 adjacent end 44 that engage cooperative fasteners 36 mounted on bottom surface 60 of liner 50 in the extending end portion 62 of liner 50.

Similar to patient transfer device 10, an air inlet tube 42 of device 46 is shown extending from the end 44 of the mattress 48 to illustrate that the mattress 48 preferably includes an inlet port adapted to provide for longitudinal connection between the mattress 48 and a source of air.

The foregoing describes the invention in terms of embodiments preferred by the inventors for which an enabling description was available, notwithstanding that insubstantial modifications of the invention, including those not presently foreseen, may nonetheless represent equivalents thereto.

What is claimed is:

1. A patient transfer device comprising:

an inflatable mattress including top and bottom sheets, the top sheet including opposite side edges, the bottom sheet defining a plurality of openings to create a cushion of escaping air beneath the mattress to facilitate sliding of the mattress with respect to an underlying support surface; and a liner releasably attached to the inflatable mattress, the liner including an intermediate portion adapted to cover the top sheet of the mattress and opposite side portions extending beyond the side edges of the top sheet, the mattress including a plurality of mounting tabs for attaching the side portions of the liner to the mattress, the mounting tabs having upper and lower surfaces, the side portions of the liner turned to attach to the lower surfaces of the mounting tabs such that each of the side portions defines a looped envelope enclosing a side panel of the mattress.

2. The patient transfer device according to claim 1, wherein the mounting tabs are located adjacent the bottom sheet of the mattress.

3. The patient transfer device according to claim 1, wherein the liner is releasably attached to the mattress by snaps.

4. A patient transfer device comprising:

an inflatable mattress including top and bottom sheets, the top sheet including opposite side edges, the bottom sheet defining a plurality of openings to create a cushion of escaping air beneath the mattress to facilitate sliding of the mattress with respect to an underlying support surface; and a liner including a central portion adapted to cover the top sheet of the mattress and opposite side portions, each of the side portions of the liner adapted for releasable attachment to the mattress adjacent the bottom sheet of the mattress, the mattress including a plurality of mounting tabs for attaching the side portions of the liner to the mattress, the mounting tabs having upper and lower surfaces, the side portions of the liner turned to attach to the lower surfaces of the mounting tabs such that each of the side portions of the liner defines a loop enclosing a side panel of the mattress.

5. A patient transfer device comprising:

an inflatable mattress including top and bottom sheets, the bottom sheet defining a plurality of openings;

a liner including a central portion adapted to cover the top sheet of the mattress and opposite side portions; and a plurality of elongated straps secured to the mattress, each of the side portions of the liner attached to at least one of the straps, the straps adapted to extend laterally with respect to the mattress along a support surface for the mattress such that each of the liner side portions is attached to the straps at a distance from the mattress.

6. The patient transfer device according to claim 5, wherein each of the straps is secured to the mattress adjacent a periphery of the bottom sheet.

7. The patient transfer device according to claim 5, wherein the side portions of the liner are attached to the straps adjacent a terminal end of the straps.

8. The patient transfer device according to claim 5, wherein the liner is attached to the straps by snaps.

9. The patient transfer device according to claim 5, wherein the liner is attached to an upper surface of the straps.

* * * * *